United States Patent
Salo et al.

(10) Patent No.: US 10,045,211 B2
(45) Date of Patent: Aug. 7, 2018

(54) AUTHENTICATION AND AUTHORIZATION OF MOBILE DEVICES FOR USAGE OF ACCESS POINTS IN AN ALTERNATIVE NETWORK

(71) Applicant: BANDWIDTHX INC., Carlsbad, CA (US)

(72) Inventors: Randy Salo, San Diego, CA (US); Christian Van Hamersveld, San Marcos, CA (US); Pertti Visuri, Fallbrook, CA (US)

(73) Assignee: BandwidthX Inc., Carlsbad, CA (US)

( * ) Notice: Subject to any disclaimer, the term of this patent is extended or adjusted under 35 U.S.C. 154(b) by 0 days.

(21) Appl. No.: 15/280,355

(22) Filed: Sep. 29, 2016

(65) Prior Publication Data

US 2017/0094515 A1    Mar. 30, 2017

Related U.S. Application Data

(60) Provisional application No. 62/234,431, filed on Sep. 29, 2015.

(51) Int. Cl.
*H04W 4/00* (2018.01)
*H04W 12/06* (2009.01)
(Continued)

(52) U.S. Cl.
CPC .......... *H04W 12/06* (2013.01); *H04L 63/083* (2013.01); *H04L 63/102* (2013.01); *H04W 12/08* (2013.01);
(Continued)

(58) Field of Classification Search
CPC ..... H04W 48/20; H04W 12/08; H04W 88/06; H04W 36/08; H04W 36/32; H04W 36/36;
(Continued)

(56) References Cited

U.S. PATENT DOCUMENTS 5,426,674 A    6/1995   Nemirovsky et al.
6,396,816 B1   5/2002   Astle et al.
(Continued)

FOREIGN PATENT DOCUMENTS

WO    2006/126062 A1    11/2006
WO    2013/044958 A1    4/2013

OTHER PUBLICATIONS

International Search Report and Written Opinion for related international application No. PCT/US2016/054434, dated Jan. 24, 2017.
(Continued)

*Primary Examiner* — Quan M Hua
(74) *Attorney, Agent, or Firm* — Jonathan D. Cheng

(57) ABSTRACT

Authentication and authorization of mobile devices for usage of access points in an alternative network. In an embodiment, a mobile device identifies an access point that is available to provide connectivity. A limited connection is established with the identified access point, which permits only a bandwidth exchange (BX) application to utilize a network to which the identified access point provides access. The BX application is executed to initiate authorization with a remote server over the network. After authorization has been completed, the limited connection is switched to a non-limited connection, in which other applications are permitted to utilize the network, according to terms and conditions associated with the identified access point.

25 Claims, 4 Drawing Sheets

(51) Int. Cl.
  *H04W 76/11* (2018.01)
  *H04W 12/08* (2009.01)
  *H04W 24/10* (2009.01)
  *H04W 76/02* (2009.01)
  *H04L 29/06* (2006.01)
  *H04W 88/08* (2009.01)

(52) U.S. Cl.
  CPC ......... *H04W 24/10* (2013.01); *H04W 76/021* (2013.01); *H04W 76/11* (2018.02); *H04W 88/08* (2013.01)

(58) Field of Classification Search
  CPC .... H04W 48/16; H04L 12/5692; H04L 43/50; H04L 41/503
  See application file for complete search history.

(56) References Cited

U.S. PATENT DOCUMENTS

| | | | |
|---|---|---|---|
| 7,043,225 | B1 | 5/2006 | Patel et al. |
| 8,743,696 | B2 | 6/2014 | Chowdhury |
| 8,750,123 | B1 | 6/2014 | Alisawi |
| 9,001,787 | B1 | 4/2015 | Conant et al. |
| 9,110,661 | B2 | 8/2015 | Lynar et al. |
| 9,125,055 | B1 | 9/2015 | Jones et al. |
| 9,232,434 | B2 | 1/2016 | Rong et al. |
| 9,325,621 | B1 | 4/2016 | Ramamurthy et al. |
| 9,532,269 | B2 | 12/2016 | Hong |
| 2001/0032262 | A1 | 10/2001 | Sundqvist et al. |
| 2004/0165605 | A1 | 8/2004 | Nassar |
| 2004/0168088 | A1 | 8/2004 | Guo et al. |
| 2005/0018686 | A1* | 1/2005 | Igarashi ............... H04W 48/14 370/395.2 |
| 2005/0243778 | A1* | 11/2005 | Wang ................. H04L 12/2856 370/338 |
| 2005/0278262 | A1 | 12/2005 | Cheliotis et al. |
| 2006/0031444 | A1 | 2/2006 | Drew |
| 2006/0073840 | A1 | 4/2006 | Akgun et al. |
| 2006/0167784 | A1 | 7/2006 | Hoffberg |
| 2007/0011080 | A1 | 1/2007 | Jain et al. |
| 2008/0015914 | A1 | 1/2008 | Jacobs et al. |
| 2008/0062933 | A1 | 3/2008 | Liu et al. |
| 2008/0279147 | A1 | 11/2008 | Hassan et al. |
| 2009/0207824 | A1* | 8/2009 | Lee ....................... H04W 88/08 370/338 |
| 2009/0292629 | A1 | 11/2009 | Lynch et al. |
| 2010/0145161 | A1 | 6/2010 | Niyato et al. |
| 2011/0029675 | A1 | 2/2011 | Yeow et al. |
| 2011/0237202 | A1* | 9/2011 | Uemura ............ H04W 36/0088 455/67.14 |
| 2011/0286437 | A1 | 11/2011 | Austin |
| 2011/0294539 | A1 | 12/2011 | Shin et al. |
| 2011/0320588 | A1 | 12/2011 | Raleigh |
| 2012/0014332 | A1 | 1/2012 | Smith |
| 2012/0142382 | A1 | 6/2012 | Stanforth et al. |
| 2012/0230191 | A1* | 9/2012 | Fang .................... H04W 36/22 370/235 |
| 2012/0238287 | A1* | 9/2012 | Scherzer ............. H04W 48/16 455/456.1 |
| 2012/0303788 | A1 | 11/2012 | Heinrich et al. |
| 2012/0303829 | A1* | 11/2012 | LaFrance ........... B60L 11/1848 709/229 |
| 2013/0070594 | A1 | 3/2013 | Martin et al. |
| 2013/0081121 | A1* | 3/2013 | Green .................. H04L 9/0827 726/7 |
| 2013/0089056 | A1 | 4/2013 | Iwai et al. |
| 2013/0152168 | A1 | 6/2013 | Nasir et al. |
| 2013/0176952 | A1 | 7/2013 | Shin et al. |
| 2013/0301609 | A1 | 11/2013 | Smith et al. |
| 2013/0311778 | A1 | 11/2013 | Cherukuri et al. |
| 2013/0322329 | A1* | 12/2013 | Visuri ................... H04W 48/16 370/328 |
| 2013/0322401 | A1 | 12/2013 | Visuri et al. |
| 2013/0324104 | A1 | 12/2013 | Cavilla et al. |
| 2014/0031029 | A1 | 1/2014 | Rajagopalan |
| 2014/0036691 | A1 | 2/2014 | Madan |
| 2014/0086211 | A1 | 3/2014 | Liu |
| 2014/0220993 | A1 | 8/2014 | Cordeiro |
| 2014/0295825 | A1* | 10/2014 | Chuang ................ H04W 24/04 455/425 |
| 2014/0341109 | A1 | 11/2014 | Cartmell et al. |
| 2015/0215816 | A1 | 7/2015 | Abou-Elkheir |
| 2015/0365887 | A1* | 12/2015 | Tong .................... H04W 76/14 370/328 |
| 2016/0183139 | A1 | 6/2016 | Meredith et al. |
| 2016/0227471 | A1* | 8/2016 | De Foy ................ H04W 4/001 |
| 2016/0295412 | A1* | 10/2016 | Peterson .............. H04W 12/08 |
| 2017/0272995 | A1 | 9/2017 | Kim et al. |

OTHER PUBLICATIONS

International Search Report and Written Opinion for related PCT Application No. PCT/US2014/072863, dated Apr. 24, 2015, in 11 pages.

International Search Report and Written Opinion for related PCT Application No. PCT/US2014/072864, dated Apr. 13, 2015, in 14 pages.

International Search Report and Written Opinion for related PCT Application No. PCT/US2014/073000 dated Apr. 21, 2015, in 12 pages.

European Search Report dated Nov. 3, 2017 for related EP Patent Application No. 14876771.8.

European Search Report dated Oct. 27, 2017 for related EP Patent Application No. 14876245.3.

\* cited by examiner

US 10,045,211 B2

AUTHENTICATION AND AUTHORIZATION OF MOBILE DEVICES FOR USAGE OF ACCESS POINTS IN AN ALTERNATIVE NETWORK

CROSS-REFERENCE TO RELATED APPLICATIONS

This application claims priority to U.S. Provisional Patent App. No. 62/234,431, filed on Sep. 29, 2015, and titled "Systems and Methods for Controlling BXMarket," the entirety of which is hereby incorporated herein by reference.

BACKGROUND

Field of the Invention

The embodiments described herein are generally directed to authentication and/or authorization, and, more particularly, to authentication and/or authorization of mobile devices' for usage of access points in an alternative network.

Description of the Related Art

Continuing to serve mobile devices and devices belonging to the so called Internet of Things (IoT) requires increasingly specialized network resources and continually increasing capacity. The practical reality is that the various network resources belong to one set of companies, while another set of companies use and enhance those resources with other service elements to provide a complete end-user service to consumers and devices connected to a network (e.g., the Internet). This situation is described in various documents, which describe needs and requirements for the next generation mobile networks, and which are sometimes called the 5G network standard.

One early network resource type that is available to mobile devices, for use as a radio access technology and an alternative and complement to cellular data networks, is Wi-Fi™. The utilization of Wi-Fi™ capacity with connections to the Internet is capable of providing a significant portion of available wireless connectivity for mobile devices that would otherwise rely on cellular connections provided by mobile network operators. This resource can be extended outside device users' homes and work environments by automating connections to third-party Wi-Fi™ and providing an opportunity for mobile network operators to automatically purchase Wi-Fi™ access when and where it is needed, based on policies, prices, and access conditions defined by the sellers of the Wi-Fi access and the device users, as described in U.S. patent application Ser. No. 13/684,048 (filed Nov. 21, 2012, and issued as U.S. Pat. No. 9,084,179 on Jul. 14, 2015) and Ser. No. 14/225,310 (filed Mar. 25, 2014, and published as U.S. Patent Pub. No. 2014/0293829 on Oct. 2, 2014), which are both hereby incorporated herein by reference as if set forth in their entireties.

Conventional solutions rely on a network selection mechanism that involves determining the access network to be used based on various conditions. Typically, this determination and the routing of data traffic are performed by an application executing on the mobile device. However, it is not always practical to have this determination implemented in the mobile device.

SUMMARY

Certain embodiment described herein facilitate interactions between companies and their various systems so that network resources provided by some companies can be efficiently made available to other companies who can create value by using the resources in the services they provide.

In addition, embodiments are described herein for managing access to network resources. While Wi-Fi™ will be used herein as a primary example of such network resources, the described embodiments may be applied to other types of resources.

Furthermore, certain embodiments described herein achieve the benefits of micro-commerce and conditional access to Wi-Fi™ capacity without the need to perform the determination of which access network to be used at the mobile device.

In an embodiment, a method is disclosed. The method comprises using at least one hardware processor of a mobile device to: identify an access point that is available to provide connectivity to the mobile device; establish a limited connection with the identified access point via at least one radio system of the mobile device, wherein the limited connection permits only a bandwidth exchange (BX) application, from a plurality of applications stored in a memory of the mobile device, to utilize at least one network to which the identified access point provides access; execute the BX application to initiate authorization with a remote server over the at least one network via the limited connection established with the identified access point; and, after authorization has been completed, switch the limited connection to a non-limited connection, in which other applications, from the plurality of applications, are permitted to utilize the at least one network, to which the identified access point provides access, according to terms and conditions associated with the identified access point.

In another embodiment, a mobile device is disclosed. The mobile device comprises: at least one radio system; a memory that stores a plurality of applications, including a bandwidth exchange (BX) application; and at least one processor that identifies an access point that is available to provide connectivity to the mobile device, establishes a limited connection with the identified access point via the at least one radio system, wherein the limited connection permits only the BX application, from the plurality of applications, to utilize at least one network to which the identified access point provides access, executes the BX application to initiate authorization with a remote server over the at least one network via the limited connection established with the identified access point, and, after authorization has been completed, switches the limited connection to a non-limited connection, in which other applications, from the plurality of applications, are permitted to utilize the at least one network, to which the identified access point provides access, according to terms and conditions associated with the identified access point.

In another embodiment, a non-transitory computer-readable medium, having instructions stored therein, is disclosed. The instructions, when executed by a processor of a mobile device, cause the processor to: identify an access point that is available to provide connectivity to the mobile device; establish a limited connection with the identified access point via at least one radio system of the mobile device, wherein the limited connection permits only a bandwidth exchange (BX) application, from a plurality of applications stored in a memory of the mobile device, to utilize at least one network to which the identified access point provides access; execute the BX application to initiate authorization with a remote server over the at least one network via the limited connection established with the identified access point; and, after authorization has been completed, switch the limited connection to a non-limited connection, in which other applications, from the plurality of applications, are permitted to utilize the at least one network, to which the identified access point provides access, according to terms and conditions associated with the identified access point.

In another embodiment, a method is disclosed. The method comprises using at least one hardware processor of a mobile device to: identify an access point that is available to provide connectivity to the mobile device; receive credentials for a remote authentication server; encode an identifier of the identified access point in the credentials; and send the credentials, comprising the encoded identifier of the identified access point, to the remote server.

In another embodiment, a mobile device is disclosed. The mobile device comprises: at least one radio system; and at least one processor that identifies an access point that is available to provide connectivity to the mobile device, receives credentials for a remote authentication server, encodes an identifier of the identified access point in the credentials, and sends the credentials, comprising the encoded identifier of the identified access point, to the remote server.

In another embodiment, a non-transitory computer-readable medium, having instructions stored therein, is disclosed. The instructions, when executed by a processor of a mobile device, cause the processor to: identify an access point that is available to provide connectivity to the mobile device; receive credentials for a remote authentication server; encode an identifier of the identified access point in the credentials; and send the credentials, comprising the encoded identifier of the identified access point, to the remote server.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

1. Architecture Overview

Embodiments described herein may be referred to as the "Bandwidth Exchange Market," "BxMarket," or "BX." Embodiments of the BX can make it possible for wireless mobile devices and access points to conduct (micro)-commerce for bandwidth or data connectivity. Embodiments of BX can include agreements with wireless operators, service providers, individual mobile device users, individuals or companies that own or control Wi-Fi™ access points, and/or Internet Service Providers (ISPs).

Figure 1:
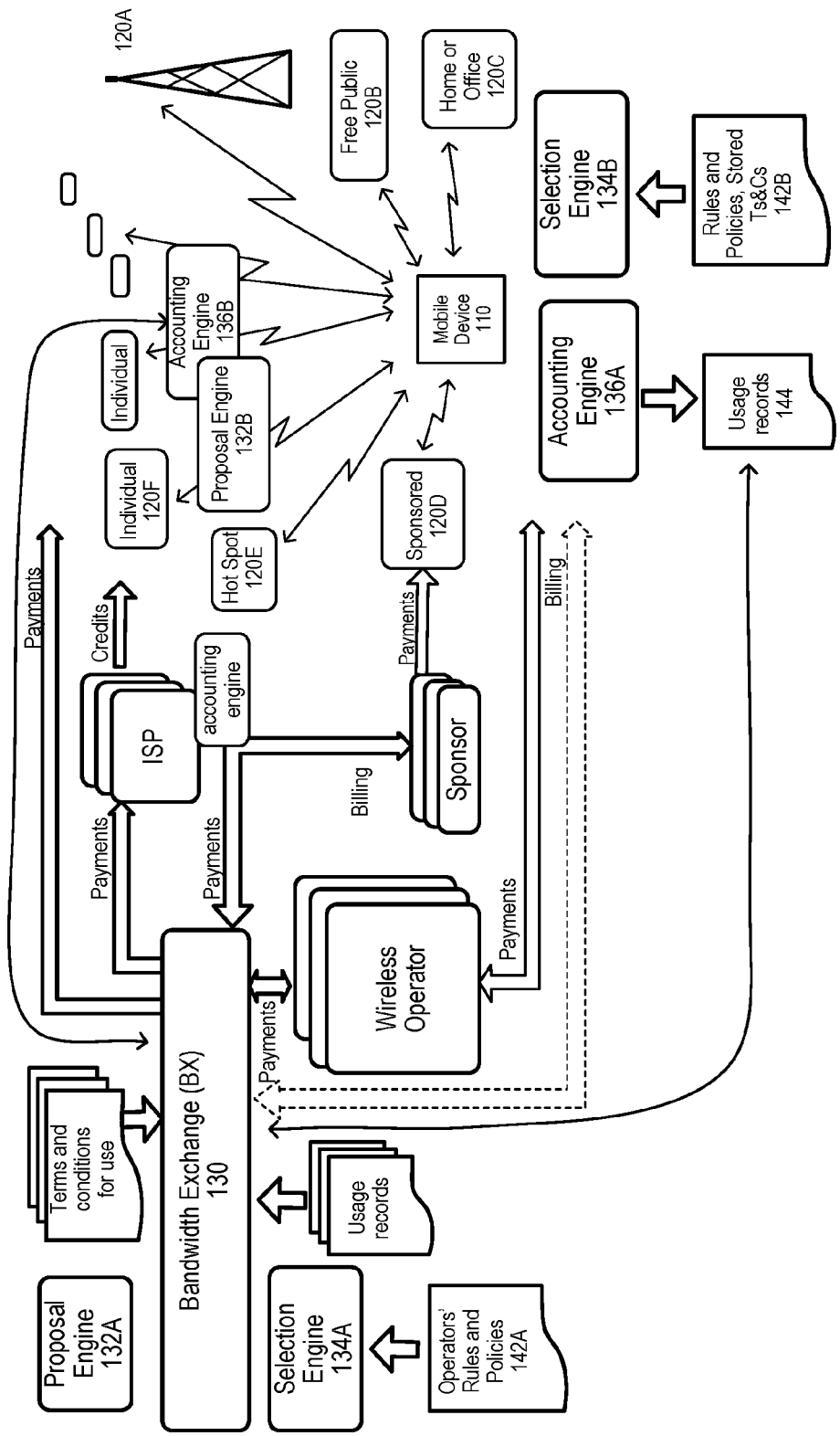
FIG. 1 illustrates components of an infrastructure for a market in bandwidth, according to an embodiment.

FIG. 1 is a functional block diagram illustrating components of the disclosed system, according to an embodiment. As illustrated, a mobile device 110 may communicate with any of a plurality of access points 120. For example, access points 120 may include a base station 120A, a free public access point 120B, a home or office access point 120C, a sponsored access point 120D, a hot spot 120E, other mobile devices 120F, and/or the like. In each case, access point 120 provides mobile device 110 with access to a network. For example, base station 120A may provide mobile device 110 with access to a cellular network, whereas home access point 120B may provide mobile device 110 with access to a home Wi-Fi™ network. In either case, the network may provide access to additional networks, including public networks, such as the Internet.

Embodiments utilize this infrastructure of mobile devices 110, access points 120, and the networks to which access points 120 provide access, to implement a Bandwidth Exchange Market (BX) 130. BX 130 is facilitated by one or more proposal engines 132, one or more selection engines 134, and one or more accounting engines 136.

In an embodiment, proposal engine 132 is a module (e.g., software or hardware module) that may reside in an access point 120, in the network to which the access point 120 provides access, and/or on a BX computer system that communicates with mobile device 110. Proposal engine 132 may provide access, or a reference, to the terms and conditions for using a particular connection or connections (e.g., for using a particular access point 120 and its corresponding network).

In an embodiment, selection engine 134 is a module (e.g., software or hardware module) that can work independently of a mobile device 110, on a BX computer system that communicates with a standard authentication server, or as a cooperative combination of functions executed on mobile device 110, an authentication server, and/or server computer of BX 130. Selection engine 134 may perform the determination of which connection (e.g., which access point 120) to use.

In an embodiment, accounting engine 136 keeps track of the usage of the connections, selected by selection engine 134, and reports this usage to BX 130. Accounting engine 115 can be implemented either on an access point 120, at an access gateway server in the network corresponding to an access point 120, on BX servers, and/or as software executed on mobile device 110.

For ease of understanding, the following examples illustrate mobile devices 110 that utilize both Wi-Fi™ and Long-Term Evolution (LTE) wireless communication connections. However, it should be understood that the same mechanisms and principles can be used to implement the disclosed BX 130 and connection proposal and selection functions for any other combination of radio systems or network resources (e.g., 2G, 3G, 4G, 5G, Bluetooth™, etc.).

2. Selection Engine

In an embodiment, mobile wireless devices 110 that participate in the BxMarket (e.g., by registering with BX 130) have the ability to establish multiple wireless connections. In an embodiment, selection engine 134 manages the connections available to mobile devices 110. Selection engine 134 may execute on a server system of BX 130 and communicate with a mobile device 110 via a network to which that mobile device 110 has established a connection via an access point 120. Selection engine 134 may base its selections and/or other operations on rules and policies 142 that have been set either by the wireless operator and/or the end user of mobile device 110. In some cases, some rules and policies 142A may be controlled by the operator and other rules and policies 142B may be set at the discretion of the user. There can also be a set of default rules and policies, such that the user does not need to do anything to begin using BX 130.

Rules and policies 142 control which of the connections, available to mobile device 110, will be selected at any given time, possibly for each of one or more applications, executing on mobile device 110, that needs a data connection. The level of sophistication (e.g., the number of factors or complexity in the combination of factors considered by rules and policies 142) used in the selection process may vary between embodiments. In one embodiment one or more of the following factors are collected for each available access point 120, detected by mobile device 110 at the time of selecting a connection to use (e.g., for a particular application), and utilized by rules and policies 142 to select the access point 120 to use:

- Price and/or other terms and conditions of using an access point 120, participating in the BxMarket (e.g., by registering with BX 130), for a connection. The price and/or terms and conditions may be provided by a proposal engine 132 executing on the corresponding access point, on a server of BX 130, and/or another system communicatively connected to mobile device 110.
- Quality of the signal, provided by an access point 120, based, for example, on a measurement of the signal strength (e.g., signal-to-noise ratio) or any other relevant parameter that is available from a radio system of mobile device 110 that is capable of communicating with the access point 120.
- Level of security available for using the connection provided by an access point 120.
- Throughput capacity of the connection provided by an access point 120.
- Reliability (e.g., packet loss) of the connection provided by an access point 120.
- Latency and/or jitter of the connection provided by an access point 120.
- Bandwidth need or any other needed characteristics of connectivity for an application (e.g., executing on mobile device 110 and/or requesting a connection) which will utilize the connection to access point 120.
- The website or other service that mobile device 110 will access via the connection provided by an access point 120. For example, an access point 120 may only provide access to certain websites or services. In this manner, access providers or vendors may sponsor connectivity that allows the end user to visit their website and make purchases.
- Information about special promotions and/or sponsorship for the connection provided by an access point 120. For example, an available access point 120 may offer a lower cost or may be free, in exchange for acceptance or viewing of advertising or other commercial messages. Another available access point 120 may offer a lower cost or may be free, in exchange for the user agreeing to the collection of information about the user and/or mobile device 110 (e.g., location-based information) by the access provider, completing a survey, etc.
- Acceptability of delay in transmitting the data (e.g., as pre-specified by the provider of an application which will use the connection, or by the end user for an application which will use the connection) and the time elapsed from when an original request (e.g., by an application) was made for the data transmission. For example, a user of an application which uploads photographs to online storage (e.g., cloud storage) may specify that a delay of a particular interval (e.g., one hour) is acceptable, such that, when the upload of a new photograph is requested, selection engine 134 may delay selection of an access point 120—thereby, effectively delaying the upload—for up to the interval (e.g., one hour), in order to see if a free connection becomes available within the interval, before selecting a connection with a non-zero price. Selection engine 134 may store different acceptable delay intervals for different cost levels or for other specified characteristics of available connections. For example, selection engine 134 may delay establishing a connection for up to $t_1$ hours if the lowest-cost connection that is available costs $p_1$, and may delay establishing a connection for up $t_2$ hours if the lowest-cost connection that is available costs $p_2$, where, for example, $t_1 > t_2$ and $p_1 > p_2$. In this manner, selection engine 134 will delay establishing a connection for longer as the lowest price available for a connection becomes higher.
- Estimated drain on battery power from using the connection provided by an access point 120.
- Speed, reliability, or other characteristics of any connection that mobile device 110 is currently using or has used in the past.
- Available data transfer speed of the connection provided by an access point 120 per an agreement between an operator of the access point 120 and the mobile network provider with whom the end user of mobile device 110 has subscribed.
- Geographic location of mobile device 110.
- Information about the movement of mobile device 110, as acquired from a motion sensor, accelerometer, Global Positioning System (GPS) receiver (e.g., by tracking GPS data collected from the GPS receiver), and/or other sensor or device within mobile device 110.
- Special instructions from the mobile network provider with whom the end user of mobile device 110 has subscribed.

It should be understood that this list of factors is merely illustrative and that additional or different factors may be included in the selection process of selection engine 134.

In an embodiment, selection engine 134 implements a function to select which data connection to use for each of a plurality of applications executing on mobile device 110. This selection process may be performed on a real-time, moment-by-moment basis, based on rules and policies 142 and current information about each available connection (e.g., price for using the connection and/or any other factors). This information may be obtained from BX 130 based on a reference system that is explained in more detail elsewhere herein.

In an embodiment in which selection engine 134 is hosted on a computer device in BX 130 or elsewhere on the network, mobile device 110 may utilize Passpoint™ (also known as Hotspot 2.0), 802.11x, or Wireless Internet Service Provider roaming (WISPr) for establishing authenticated and authorized connections. In this case, access point 120 requires mobile device 110 to provide credentials (e.g., in the form of a user name and password) in order to be granted access to the network. These credentials may be passed by access point 120 to an authentication server, which may forward the credentials through a chain of authentication servers, utilizing so-called realm identifiers to guide the successive authentication servers in routing the authentication and authorization requests.

Figure 2:
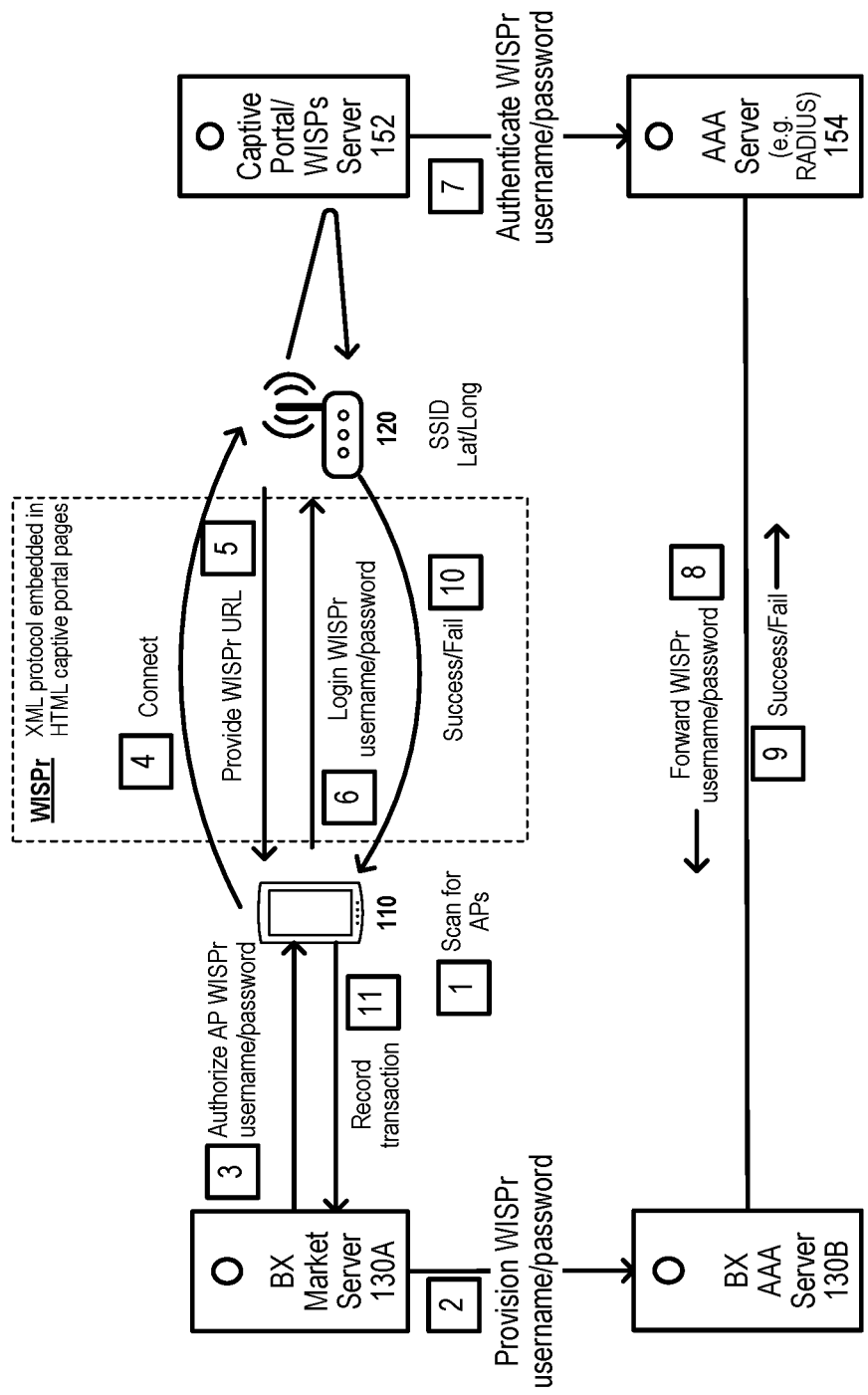
FIG. 2 illustrates an authentication process using Wireless Internet Service Provider roaming (WISPr), according to an embodiment.

FIG. 2 illustrates an authentication process for WISPr, according to an embodiment:

(1) Mobile device 110, with a BX function (e.g., embedded into a third-party application), scans for available access points, and sends a list of available access points that it can "see" to BX Market Server 130A. BX Market Server 130A sends back, to mobile device 110A, an ordered list of the access points 120 to which mobile device 110 may connect. For purposes of the illustration, assume that the access point 120, illustrated in FIG. 2, is first on the ordered list returned by BX Market Server 130A.

(2) BX Market Server 130A provisions WISPr credentials to BX Authentication, Authorization, and Accounting (AAA) Server 130B.

(3) BX Market Server 130A starts a process to authorize mobile device 110 on access point 120, and sends WISPr credentials to mobile device 110.

(4) Mobile device 110 attempts to connect to access point 120.

(5) Captive Portal/WISPr Server 152 (via access point 120) provides mobile device 110 with the WISPr gateway uniform resource locator (URL).

(6) Mobile device 110 logs into access point 120 using WISPr credentials, which are passed by access point 120 to Captive Portal/WISPr Server 152.

(7) Captive Portal/WISPr Server 152 authenticates the received WISPr credentials by sending them to its AAA Server 154.

(8) AAA Server 154 forwards the WISPr credentials to BX AAA Server 130B, which compares the WISPr credentials, forwarded from AAA Server 154, with the WISPr credentials received from BX Market Server 130A in step (2). This "closes the loop" and prevents unauthorized authentication attempts. If the WISPr credentials match, then BX AAA Server 130B determines that the authentication is successful. Otherwise, if the WISPr credentials do not match, BX AAA Server 130B determines that the authentication fails.

(9) BX AAA Server 130B returns the success or failure result from step (8) to AAA Server 154.

(10) The success or failure result is routed through AAA Server 154 to Captive Portal/WISPr Server 152 to access point 120 to mobile device 110. At this point, the WISPr credentials are deleted from mobile device 110, and mobile device 110 commences a connection to the network (e.g., Internet) via access point 120.

(11) Mobile device 110 records the transaction with access point 120 and reports its usage of the connection, provided by access point 120, to BX Market Server 130A.

Similar authentication processes can be envisioned for other authentication protocols, such as those mentioned above.

In one embodiment, a key to implementing the functionality of the BX selection engine 134, outside of mobile device 110, lies in this process of provisioning the necessary credentials to BX AAA Server 130B just in time and based on the determination, by the selection engine 134 running on servers of BX 130, about whether or not a connection to a particular access point 120 is desirable (e.g., as determined by applying rules and policies 142 to one or more factors). In other words, if the connection is desirable, the connection is authorized, and, if the connection is not desirable, the connection is not authorized.

Figure 3:
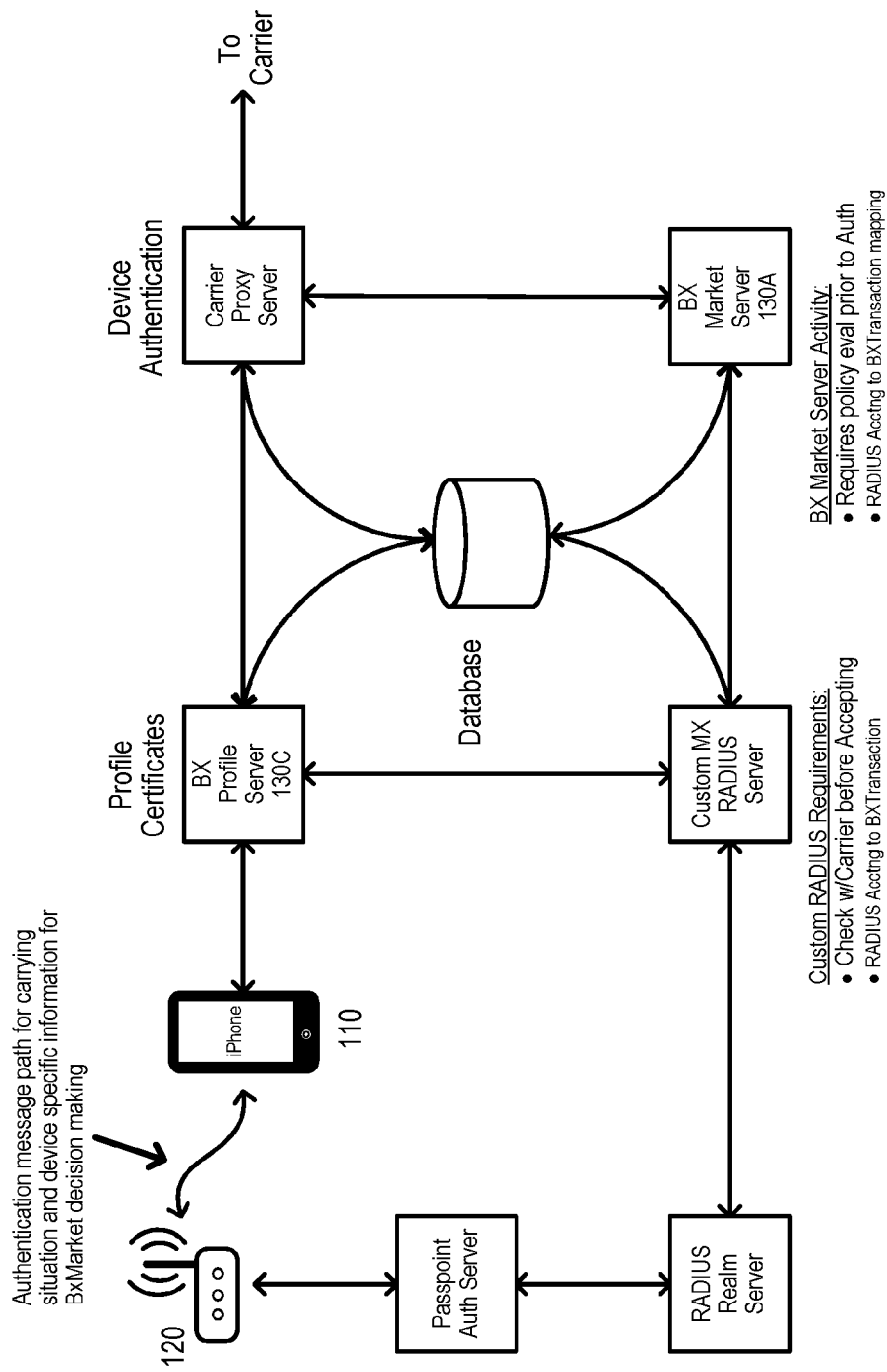
FIG. 3 illustrates an authentication process using Passpoint™, according to an embodiment.

In an embodiment, specific profiles are implemented in mobile devices 110 in accordance with the Passpoint™ Wi-Fi™ automation mechanism. FIG. 3 illustrates an example of such an embodiment for a mobile device 110 that utilizes the iOS™ operating system:

(1) Application resident on mobile device 110 requests standalone Safari™ to open a web-based profile.

(2) BX Profile Server 130C receives the request with device certificate and validates mobile device 110 with its carrier.

(3) A configuration profile is returned to mobile device 110. The configuration profile defines to which access points (e.g., to which SSIDs) mobile device 110 will automatically attempt to associate. The configuration profile may also contain encoded device identifiers as the device ID. The encoded device identifiers may be used to identify mobile device 110 for selection engine 134 and for authentication (e.g., BXDevice: <deviceid>|<password>ÅTTLS|MSCHAPv2).

(4) When the encoded credentials are forwarded to BX 130 for authentication, the BX servers may attempt to validate mobile device 110 with the carrier again or may rely on previous validation and authorization records that may have a Time-to-Live (TTL) associated with the authorization.

(5) The selection engine 134 in the BX servers check buy/sell policies, and, if the connection is desirable, grants access to mobile device 110.

(6) RADIUS Accounting records may be used for byte usage counting and the creation of accounting records for BX 130.

Similar mechanisms for other operating systems and devices can be envisioned based on the above description.

In this particular embodiment, there is the benefit that, if a connection is not authenticated, mobile device 110 will automatically disassociate from access point 120, since the authentication process is part of the standard 802.11x or Passpoint™ process and is considered to be a part of the association process, which is not complete unless a successful authentication and authorization is achieved. In cases in which there is no Passpoint™ or 802.11x association process implemented on access point 120 (e.g., a Wi-Fi access point), mobile device 110 remains associated with access point 120 even in the case that the authentication fails. In this case, there are two alternative mechanisms to ensure that data connectivity remains functional.

In one mechanism, a separate process is implemented on mobile device 110 to disassociate from access point 120 in the event that the connection is not authorized. In this case, the data connection may be automatically transferred to another available access point 120.

The other mechanism is to keep the initial data connection active, in parallel with the process of associating and authenticating the connection to another access point 120. There are well-known mechanisms for implementing such simultaneous multiple network data connections to the Internet. These are sometimes referred to as multi-path Internet Protocol (IP) connections.

When continued data connectivity is available through another data access network, (e.g., an LTE network connection), the fact that mobile device 110 may remain associated to an access point 120 without an Internet connection does not cause a disruption in data flow or in the user experience. Eventually, when mobile device 110 moves out of range of access point 120, mobile device 110 will automatically disassociate from access point 120.

To support the decision-making, within selection engine 134, about which connections to use, mobile devices 110 may, independent from the actual association process, provide information to selection engine 134 about their locations, quality of the connections they are currently using or have been previously using (e.g., Wi-Fi connections and other connections), and cellular sector radio identifiers, if available. In addition, mobile device 110 may, periodically or from time to time, send other information about the device's operation and the environment to selection engine 134, such as information about access points 120 that mobile device 110 has observed during scans (e.g., Wi-Fi scans).

In an embodiment, information about mobile device 110 and its connection with an access point 120 is included in the message that carries the authentication information to the servers of BX 130 for authentication and authorization purposes. For example, the standard authentication protocol already in use for tens of millions of access points allows for 63 characters to be used for the username field. Utilizing an efficient information-encoding mechanism (e.g., a base 64 character alphanumeric encoding) allows a significant amount of information to be included in the username or password field. This information may include, for example, an identifier of the specific access point 120 through which the connection is attempted. The information carried to the authentication and authorization server in the username and password field, or in other fields or parts of the request, may include other relevant situation-specific information. Such information may also include any of the factors considered by selection engine 134, as described elsewhere herein.

The information carried in the authentication and authorization request may be combined at the server side with other information. For example, the locations of each of the access points 120 may have been previously stored in databases accessible by the servers that perform the authentication and authorization tasks. Over time, the databases may also collect information, about to which cellular sector, mobile devices 110 are typically connected when they are trying to access each Wi-Fi™ access point. In this manner, it is possible to use cellular-sector-specific Wi-Fi™ connection policies, or policies that use location as a variable, even if the transmitted information only includes an identifier of the Wi-Fi™ access point. In other words, selection engine 134 may determine regional rules and policies 142 which apply to an access point 120, even when the location of the access point 120 is not received (e.g., by deriving the location of the access point 120, based on an identifier of the access point 120 and the cellular sector of mobile devices 110 which have connected to the identified access point 120 in the past).

Another example of situational information that may be stored and used by selection engine 134 to select access points 120, is past performance information for access points 120 during specific hours of a day, days of a week, etc. This past performance information may be linked to received identifiers of the access points 120 when selection engine 134 is making a determination about which access point to utilize (e.g., so as to select or prioritize higher-performing access points over lower-performing access points).

In an embodiment, an identifier of mobile device 110 may be linked, in the server-side databases of BX 130, to additional information about mobile device 110 and/or its service provider. The service provider may have provided Wi-Fi connection policies that pertain to the specific mobile device 110 or to all of mobile devices 110 served by the service provider. Thus, based solely on the identifier of a mobile device 110, the authentication and authorization server system of BX 130 may enable connection decisions that are based on refined policies of the service providers. In other words, selection engine 134 may retrieve rules and policies 142 to be used in selecting an access point 120 for a mobile device 110, based on an identifier received for that mobile device 110 (e.g., within one or more fields, such as username and password fields, of an authentication and authorization request).

In an embodiment, the mechanism of including information in the password or other fields or parts of the authentication and authorization request enables the implementation of selection engine 134 in BX server system 130 (e.g., cloud-based server system) without requiring complex software on mobile device 110 or requiring any means of communication between mobile device 110 and BX server system 130, other than industry-standard authentication and authorization mechanisms.

In an embodiment, mobile device 110 generates a detailed usage record 114 of the actual use of each connection, utilizing accounting engine 136A, based on the connectivity selections (as selected by selection engine 134) and subsequent data traffic through each connection. Accounting engine 136A (e.g., executing on mobile device 110) may transmit usage record 144 to BX 130, along with an identifier of mobile device 110 and the identifier(s) of each access point 120 that provided connectivity to mobile device 110, as well as information about the terms and conditions in force at the time of each connection. Usage record 144 can comprise, for each connection, the numbers of data bytes sent and/or received over the connection, the time duration of the connection, and/or any other relevant variable describing use of the connection. The reporting of the connection parameters can be done in compliance with the communication protocol used by the so-called Remote Authentication Dial-In User Service (RADIUS) accounting standard for mobile devices. Alternatively, the accounting and record keeping can be implemented by the servers in the authentication and authorization chain described in FIGS. 2 and 3.

Other statistics about the location of mobile device 110, signal quality, throughput, performance of access points 120, and/or other parameters regarding connectivity (e.g., the speed and availability of connections through the mobile operators' 3G or 4G systems), along with the specific time of these observations, may also be collected and transmitted to BX 130. BX 130 may use this data to compile useful information about the quality of connectivity in various locations and the need for data capacity, including time-of-use data and historical trends, in those locations. This compiled information can be used by Wi-Fi™ system operators and owners to make decisions about pricing or adding capacity (e.g., in the form of registering existing access points with BX 130, and/or installing new Wi-Fi™ access points or other alternative networks). These actions provide an opportunity for the owners or operators of buildings or access points to participate in the commerce of bandwidth through BX 130.

In an embodiment, selection engine 134 uses a combination of information to implement the rules and policies 142 for selecting an access point 120 for connectivity. For example, selection engine 134 may be aware of the access points 120 provided directly by the service provider for mobile devices 110 subscribed to its network, and may also be familiar with access points 120 that have been configured for mobile devices 110 by their end users (e.g., access points 120C at the users' homes and offices, free access points 120B, sponsored access points 120D, etc.). However, in BX 130, a new source of real-time information about connectivity is available from proposal engines 132, residing in third-party access points (e.g., proposal engine 132B), in the network or cloud, and/or at a location from which it can be accessed by selection engine 134 (e.g., proposal engine 132A). In order to participate in the provision of connectivity through the BxMarket, each access point 120 may have a resident proposal engine 132B, or provide a reference to a proposal engine 132 (e.g., proposal engine 132A).

3. Proposal Engine

In an embodiment, proposal engine 132 is a module which is specific to each access point 120 and makes information, about the connection that is available for use at that access point 120, available to selection engines 134. This information may include the terms and conditions (Ts&Cs), including the price of using a connection through access point 120, and/or detailed information about the characteristics of the connection through access point 120. Implementations of proposal engine 132 may vary depending on the sophistication and capabilities of the particular access point 120, on which it resides, the organization or individual that owns or operates the access point 120, and/or the technical and business arrangements that provide the connectivity (e.g., Internet connectivity) available through access point 120. Two example embodiments will be described in more detail herein. However, these embodiments are merely illustrative and non-limiting.

In a first embodiment, the proposal engine for simple access points 120, which can only broadcast their SSID and MAC address, is implemented as proposal engine 132A by the computing resources of BX 130 (e.g., in the cloud) or its partner. Selection engines 134B of mobile devices 110 that can receive the beacons of specific access points 120 can obtain the Ts&Cs and other information from BX 130 by using the identifying information (e.g., SSID, location, and/or media access control (MAC) address) of the access points 120 as a reference. This may be facilitated by including, in the SSID of the access point 120, an indication or information about its participation in the BxMarket (e.g., by including the letters "BX" in the SSID). Based on the inclusion of this indication in the SSID for an access point 120, selection engine 134B knows to check for the Ts&Cs at BX 130 without having to search through lists of participating access points' MAC addresses. Alternatively, BX 130 may provide real-time downloads of MAC addresses and associated Ts&Cs of participating access points 120 that are located in the vicinity of the current location of a mobile device 110. This expedites access to the relevant Ts&Cs and makes it possible to have this information available to selection engine 134B of mobile device 110 even in situations in which mobile device 110 does not have an open data connection to the Internet or BX 130. The current location of a mobile device 110 can be obtained from a GPS system within mobile device 110, if available, or by having mobile device 110 and/or access points 120 transmit identifiers (e.g., SSIDs or MAC addresses) of access points (whether registered with the BxMarket or not) within their scanning ranges to BX 130, and having BX 130 correlate these identifiers to a database of access point locations to determine a current location of mobile device 110. In the event of rapidly changing locations (e.g., when a mobile device 110 is located in a moving vehicle), BX 130 can extend the range of access points, to be included in the downloads, in the direction of the mobile device's movement. In other words, if mobile device 110 is not moving, BX 130 may transmit Ts&Cs for all participating access points 120 within a predetermined radius, and, if mobile device 110 is moving, BX 130 may stretch the radius in the direction of movement (e.g., to transmit Ts&Cs for all participating access points 120 within an ellipsis having one of its foci at the location of mobile device 110 and another foci somewhere along the trajectory of mobile device 110).

In a second embodiment, instead of BX 130 transmitting the Ts&Cs for access points in the vicinity of mobile device 110, access points 120 may store their respective Ts&Cs and/or other information, and provide the Ts&Cs and/or other information directly over a wireless link to selection engines 134B on each mobile device 110 that requests them. This communication can be performed using the 802.11u standard or any other standard that both mobile device 110 and access point 120 are capable of using. In an embodiment, a multi-round two-way negotiation (or auction), over the Ts&Cs to be applied to the connection, is automatically carried out between mobile device 110 and access point 120. A system for maintaining connectivity in an environment where some access points 120 have internal proposal engines 132B, and others rely on proposal engines 132A at BX 130, is illustrated in FIG. 1.

The Ts&Cs may have specified periods of validity, and, in embodiments in which the Ts&Cs are negotiated (as opposed to unilaterally set by access points 120 and/or BX 130), connectivity may be re-negotiated at specified intervals or as situations change (e.g., as needs of mobile device 110 and/or available capacity of access point 120 change). For proposal engines 132A implemented at BX 130, the periods of validity may be automatically downloaded, by selection engine 134B, to mobile device 110, along with other Ts&Cs. In the event that both proposal engine 132A and selection engine 134A are hosted on servers of BX 130, the Ts&Cs, including their periods of validity, may be made available to both proposal engine 132A and selection engine 134A within the server systems of BX 130.

The level of sophistication in the Ts&Cs may vary across participating access points 120 and across implementations of the disclosed BxMarket. These Ts&Cs may include, without limitation, one or more of the following:

Price of using the connection provided by access point 120. The price term may vary according to the time of day, day of the week, month, or year, and/or other variables, which may be dynamic (e.g., current demand from other selection engines 134).

Level of security available for the connection provided by access point 120.

Historical data about the quality of the connection provided by access point 120, including, for example, available bandwidth (throughput), packet loss, stability, jitter, and/or other performance characteristics of the connection. Selection engine 134 may use these historical performance characteristics, and/or may have mobile device 110 conduct its own tests to determine the current performance characteristics (e.g., bandwidth, jitter, packet delays, etc.) of the connection, during use of the connection, in order make its own determination about the quality of the connection.

Information about special promotions or sponsorship for the connection provided by access point 120. For example, some access points 120 may be sponsored by advertisers. In this case, the nature of the products being advertised and/or the frequency and obtrusiveness of the advertisements that a mobile device 110 must view in order to use the connection may be communicated to selection engine 134 to be used in its selection process. As an example, some end users may be interested in advertisements on topics or products that are close to their hearts, but may not be willing to tolerate advertisements on other topics, in which case selection engine 134 can ignore or reduce the weighting for access points 120 that require the intolerable advertisements.

Information about the current quality of the Internet connection that would be available through access point 120. For example, access point 120 may relay, to selection engine 134B on mobile device 110 (e.g., via the 802.11u protocol), current information about the state of congestion, latency, jitter, and/or other performance characteristics of the backhaul network of access point 120. Alternatively or additionally, these performance characteristics may be relayed over the Internet by access point 120, or networking monitoring systems for networks participating in the BxMarket, to a BX-based selection engine 132A.

Special instructions from the network operator of access point 120 and/or the service provider for mobile device 110.

Other information pertaining to the Ts&Cs for using an access point 120 may also be used by selection engine 134. For example, some access points 120 may belong to a group of hot spots controlled by a wireless operator or wireless Internet Service Provider (ISP) that offers fixed-fee or other special pricing to subscribers of their services. In the case that a mobile device 110 is a subscriber to those services, the relevant Ts&Cs may be stored in selection engine 134, and the hot spot access point 120E could provide information identifying it belongs to the group of hot spots (e.g., by including an indication of its group membership in its SSID). Alternatively or additionally, information about an access point 120E belonging to a specific group of wireless ISP hot spots, and optionally the impact of this group membership to the price of using the access point 120E, may be communicated through proposal engine 132, in the same manner as for any other access point 120.

In an embodiment, the carrier network for a mobile device 110 may transmit special information via proposal engine 132. For example, from the carrier's point of view, the desirability of transferring a mobile device 110, currently connected to the carrier's cellular base station 120A, from base station 120A to an available Wi-Fi™ access point may depend on the load to base station 120A. To manage connections to base station 120A in an optimal way, the carrier's proposal engine 132 may instruct selection engine 134 to seek the lowest price alternative (e.g., at a particular time or within a particular time period), even when a connection to the carrier's base station 120A would be available, if the load on base station 120A is high or predicted to be high (e.g., at the particular time or within the particular time period).

The number of factors to be included in the decision-making about the connection to be used may depend on the level of sophistication of proposal engine 132 and/or selection engine 134. For example, it is possible that selection engine 134 is only capable of selecting an access point 120 based on signal strength and price. In this case, those two factors will be the basis of the selection engine's decision. However, more sophisticated decisions are possible by providing more information and alternatives in the Ts&Cs provided by proposal engine 132 and/or by basing the determination in selection engine 134 on more factors.

In an embodiment, each mobile device 110 participating in the BxMarket executes a BX application resident on mobile device 110. In an embodiment, the operating system or other activity coordinating function on mobile device 110 arranges limited communications between the BX application and BX 130, via the network (e.g., Wi-Fi™ network) provided by an access point 120 to which mobile device 110 is attempting to establish a connection, before moving the data traffic from a previously established connection (e.g., cellular network) to the new connection. The limited communications via the prospective network allow the BX application to automatically handle any authentication and authorization functions, such as signing into a WISPr portal or captive portal. Alternatively, the authentication and authorization functions for the prospective connection may be performed via the previously established connection (e.g., cellular network). In either case, access to the Internet or any other network (e.g., over the prospective Wi-Fi™ connection), is cleared before any other applications "see" the connection. This can prevent an issue in which applications experience a momentary interruption in service when the network is changed (i.e., a new access point 120 is selected). In an embodiment, the user may be presented with a popup or other notification concerning the change in network.

Advantageously, in an embodiment in which limited communications are provided to the BX application via the prospective connection, this earlier access to the prospective network via a prospective access point provides the BX application with the opportunity to test the quality of the prospective network, for example, by carrying out a speed test or testing latency, jitter, and/or any other performance characteristics of the prospective network. Based on the measured performance characteristic(s), and possibly based on applicable connection policies (e.g., Wi-Fi™ connection policies), the BX application may fully establish the connection with the prospective access point, and provide instructions to the operating system or other software to transfer data traffic of all other applications, or just some specific other applications, to the prospective network. Once the connection to the prospective network, via the prospective access point, has been fully established, the previous connection may be terminated, or maintained in parallel with the new connection, depending on the circumstances. When multiple connections are simultaneously available to applications executing on mobile device 110, decisions about which applications will use which connections may be made based on the measured performance characteristics for each connection, connection policies provided to the BX application, and/or the specific needs of the applications.

Regardless of the level of sophistication used in the network selection process, each mobile device 110, participating in the BxMarket, may use connections through different access points 120 at different times. To keep track of the actual usage of each connection by each mobile device 110 (e.g., to provide information for compensation and settlements to the alternative networks) each mobile device 110 may have an accounting engine 136A. Alternatively or additionally, access points 120 may use either an embedded or cloud-based accounting engine 136B to track the capacity that each access point 120 has provided to various mobile devices 110. In an embodiment, accounting engines 136 use the methods described in the well-known RADIUS standard for access authorization and accounting, to report and keep track of usage by mobile devices 110.

4. Accounting Engine

In an embodiment, accounting engine 136 collects and provides the data for the micro-commerce in bandwidth which is used to reward and incentivize all the participants in the BxMarket. Accounting engine 136 keeps track of the capacity utilized by one or more mobile devices 110 through each of the connections that are enabled by BX 130 and/or other usage statistics, as well as the specific Ts&Cs established (e.g., negotiated) between proposal engine 132 and selection engine 134 for each specific use of a connection.

In an embodiment, as a minimum condition for operating in the BxMarket, each mobile device 110 is required to have a resident accounting engine 136A, or else be covered by an accounting engine 136B (e.g., implemented on a gateway server connected to each access point 120). In another embodiment, accounting engine 136 may be split, with one portion being implemented in each mobile device 110 and another portion being implemented in the servers of BX 130. In either case, accounting engine 136 receives the usage reports 144 from mobile device 110 and/or access point 120 or a gateway server.

For at least some connections, accounting engine 136 may receive usage records 144 from both mobile device 110 and from access point 120 or a gateway server. This provides an opportunity to audit the reports coming from mobile devices 110 to make sure that the usage is reported correctly. Specifically, the usage records 144 from multiple sources can be reconciled to ensure that they are both reporting the same data usage. In an embodiment, the transmissions from mobile device 110 to BX 130 use an authentication (e.g., digital signature) mechanism, similar or identical to those described elsewhere herein.

In an embodiment, at least some access points may also include an accounting engine 136B that can collect information about the usage of data capacity by each connected mobile device 110. Accounting engine 136B may provide these usage records to BX 130, where they may be recompiled and used to verify the usage records 144 provided by accounting engines 136A in mobile devices 110.

In an embodiment, BX 130 may automatically log into the administrator's interface of the registered access points 120 (e.g., using credentials provided by the owners of access points 120 during initial registration with BX 130) in order to retrieve the usage records for particular mobile devices 110 or mobile devices 110 generally. Even if this capability and function are only utilized in a subset of access points 120, they provide a useful auditing function to verify the accuracy of data usage records.

5. Bandwidth Exchange

In an embodiment, BX 130 manages all of the information that enables the micro-commerce between owners of access points 120, the ISPs, wireless operators, and the end users of mobile devices 110. BX 130 may further manage the billing and payments between all parties. In an embodiment, BX 130 is implemented as software modules on one or more dedicated servers or in the cloud.

6. Managing Terms and Conditions

In an embodiment, initially, when an access point 120 is added to the BxMarket, its SSID and/or other identifying information (e.g., MAC address) are registered with BX 130.

An access point 120 may have multiple SSIDs and may establish priorities for traffic within a connection, according to which SSID is used to establish that connection. In this manner, the owner of an access point 120C in the owner's home or office can dictate that any traffic for the owner's own devices will have priority (e.g., by establishing connections to the higher priority SSID), and only excess capacity in the connection is made available for commerce through the BxMarket (e.g., by only registering a lower priority SSID with BX 130).

In other cases, an owner can set up a non-private access point 120C, connected to the Ethernet port of his or her home or office gateways, but separate from a private access point that is only accessible to the user, and register the non-private access point 120C with BX 130.

In yet other cases, an owner may establish provisions and policies to allocate different priorities for traffic with different client devices. In these cases, the owner of an access point 120C may either manually select high priority devices (in which case, the owner may select his or her own devices to have the highest priority), or the system may be programmed to automatically give higher priority to devices with high signal strengths and frequent long term connections (i.e., presumably devices that belong to the owner of access point 120C), for example, as determined using one or more thresholds of signal strength or frequency of use.

In an embodiment, if an access point 120 or gateway has the capability of transmitting its Ts&Cs (e.g., price and/or other proposal information) directly to connected devices (e.g., by utilizing the 802.11u protocol), this is the preferred mechanism of automatically negotiating connections between access point 120 and mobile devices 110.

Alternatively or if an access point 120 or gateway does not have this capability, the owner of the access point may store Ts&Cs at BX 130 in association with the access point's SSID and/or other identifying information (e.g., MAC address). In this case, selection engine 134 can retrieve the Ts&Cs from BX 130, instead of receiving them directly from access point 120. As explained elsewhere herein, BX 130 can be proactive and automatically transmit (e.g., periodically, in response to a change in location of mobile device 110, in response to a request form mobile device 110, etc.) the SSIDs, authentication information, and Ts&Cs for using a connection to mobile device 110 for all registered access points 120 that are in the vicinity of mobile device 110 at any given time. The location of mobile device 110 can be made available to BX 130 either by transmitting the GPS coordinates of mobile device 110 or information about access points in range of mobile device 110, from mobile device 110 to BX 130. BX 130 can correlate this information to a database of locations for access points 120 (e.g., by retrieving all access points 120 associated in the database with a location that is within a certain vicinity of the location of mobile device 110).

7. Managing Usage Records

In an embodiment, BX 130 manages usage records 144, acquired from accounting engines 136. As selection engines 134 make decisions about which connections to use for various applications or mobile devices 110, mobile devices 110 will transmit and receive data using different access points 120 at different times.

In an embodiment, data usage for each connection gets recorded by accounting engines 136, and the resulting usage records 144 are transmitted from accounting engines 136 to BX 130. In cases in which a mobile device 110 received the Ts&Cs directly from an access point 120 (e.g., from a proposal engine 132B resident on access point 120, or through access point 120 from a proposal engine 132A in BX 130), those Ts&Cs in force at the time of the usage may also be recorded by accounting engine 136. As explained elsewhere herein, BX 130 may also get usage information from access points 120 or access control gateways that may be connected to multiple access points 120. These duplicate usage records 144 may be used for billing and for verifying the correctness of information received from mobile devices 110. As discussed elsewhere herein, usage records 144 may be obtained from accounting engines 136B resident on access points 120 through an administration interface. In another embodiment, usage records 144 may be available from gateway servers in the network of access points 120. These gateway servers may be operated for example by wireless ISPs or operators of enterprise networks. In either case, the usage records 144 for each subscriber and for each access point 120 may be compiled and used as the basis for settling compensation for bandwidth usage between all the parties involved. In an embodiment, communications between accounting engines 136 and BX 130 uses the methods described in the RADIUS standard.

8. Providing Billing and Payment Services to All Parties

Depending on the agreements between various parties, bandwidth may be sold on the BxMarket, via BX 130, from access point owners to wireless operators. These wireless operators may, in turn, bill their subscribers for the bandwidth in accordance with the subscription agreements it has with those subscribers. Alternatively or additionally, the BxMarket may establish direct relationships with the end users of mobile devices 110 and sell bandwidth directly to those end users, without wireless operators acting as middlemen. In either case, bandwidth may be sold at a fixed price, at a dynamic price, per use, per fixed time period (e.g., monthly), prepaid, postpaid, via a barter agreement (e.g., the owners of access points 120 are also usually owners of mobile devices 110 and may receive some or all of their mobile use of bandwidth from the BxMarket in exchange for making their access points' bandwidth available for other mobile devices 110 registered with BX 130), and/or in any other manner or according to any other arrangement.

Third-party aggregators can create agreements with groups of end users of mobile devices 110 and/or with groups of owners of access points 120, and negotiate "wholesale" terms with BX 130. Regardless of how the sale of bandwidth is organized, there are, on one side of the commerce transactions, the consumers of data transmission capability (i.e., the owners of mobile devices 110 and/or wireless operators with whom the owners of mobile devices 110 have subscribed) and, on the other side of the commerce transactions, the providers of the data transmission capability (i.e., the owners of access points 120). BX 130 uses the information provided by accounting engines 136 (e.g., accounting engines 136A on mobile devices 110) to settle the accounts with bandwidth providers. These bandwidth providers may be hot spot providers (or WISPs), conventional or new types of ISPs, individual access point owners, aggregators of Wi-Fi™ capacity, etc. The same accounting engine data, aggregated by ISPs (e.g., from accounting engines 136B on access points 120), can be used to provide an appropriate and agreed-upon compensation to the ISPs.

In practical terms, any compensation to the individual access point owners (e.g., homeowners, business owners, etc.), who have registered their access points 120 with BX 130, may be provided through their ISPs, as illustrated in FIG. 1. In this case, the payments received from BX 130 may be applied to the invoice that the ISP sends, to the access point owners, for the ISP's services. Frequently, the ISP provides a bundle of services (e.g., television or telephony services). Thus, the total invoice may be large enough so that this compensation mechanism can be used even for access point owners that have a great deal of BX traffic flowing through their access points.

Another set of participants in the BxMarket are sponsors of connectivity. Through agreements with the owners or operators of hot spots, or even individual access point owners, various companies may offer to pay for bandwidth in exchange for the ability to provide advertisements or commercial messages to the end users of that bandwidth. Alternatively or additionally, as discussed elsewhere herein, other forms of compensation from end users may be used. It is also possible that the use of bandwidth is sponsored only for accessing specific websites or other services. For example, access to websites that offer specific products or services for sale may be sponsored by the owners of those websites. In any case, BX 130 can provide billing to, and collect payments from, the sponsors for the usage of the sponsored bandwidth, as illustrated in FIG. 1.

The BxMarket, as embodied in BX 130, enables local micro-commerce in connectivity and data transfer capacity by making information available to potential buyers (i.e., users of mobile devices 110 and/or wireless operators to which users of mobile devices 110 have subscribed) from potential sellers (i.e., owners or operators of access points 110) and executing the micro-commerce transactions. During the process, BX 130 will accrue detailed information about the need, acceptable pricing, and availability of connectivity and data transfer capacity in different locations and at different times. There are numerous ways to charge for the services provided by BX 130, including, without limitation, one or more of the following:

- A brokerage fee arrangement which charges a percentage of the value of each transaction mediated through the BxMarket. This brokerage fee may be included in the price offered in the Ts&Cs of each connectivity proposal.
- An intermediary market maker may negotiate Ts&Cs with access point owners (with or without minimum purchases), and then sell the negotiated bandwidth to owners of mobile devices 110 on its own account at a price that mobile device owners are willing to accept.
- Membership fees may be charged for each participant in the marketplace, or only a subset of participants in the marketplace (e.g., access point owners, mobile device users, and/or wireless operators).
- Information about bandwidth needs and activities in different localities may be sold to participants in the BxMarket and/or the broader market, and/or their infrastructure providers.
- BX 130 may facilitate participation of new sellers and buyers in the BxMarket by establishing and communicating local price levels for bandwidth.
- BX 130 may create, trade in, or enable other market participants to create, buy, or sell sophisticated contracts, including guaranteed minimum bandwidth, duration of the arrangement, characteristics of the bandwidth (e.g., reliability, jitter, packet loss, etc.), etc.
- BX 130 may create, trade in, or enable other market participants to create, buy, or sell futures contracts on bandwidth in specific locations. For example, providing bandwidth during meetings, conventions, sporting events, and/or the like, in specific locations, may offer an opportunity to sell it at higher prices or higher volume.

9. Example Processing Device

Figure 4:
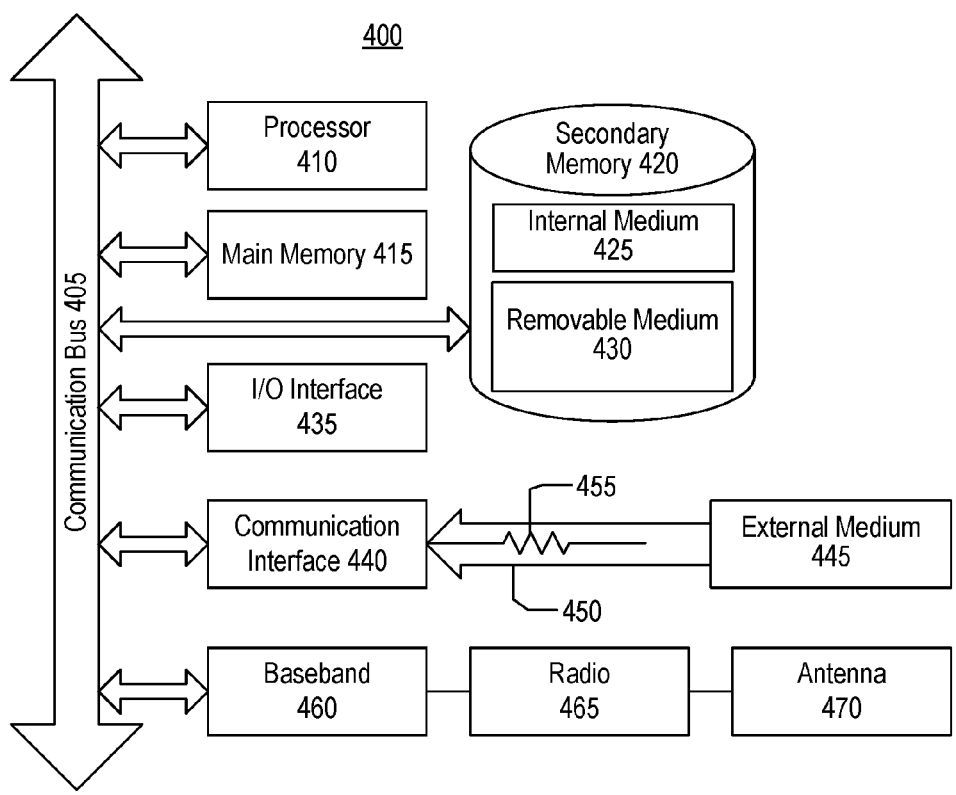
FIG. 4 illustrates an example processing system, by which one or more of the processed described herein, may be executed, according to an embodiment.

FIG. 4 is a block diagram illustrating an example wired or wireless system 400 that may be used in connection with various embodiments described herein. For example system 400 may be used as or in conjunction with one or more of the mechanisms, processes, methods, or functions described herein (e.g., to store and/or execute the BX application, proposal engines 132, selection engines 134, accounting engines 136, and/or one or more software modules thereof), and may represent components of mobile devices 110, access points 120, the servers of BX 130, and/or other processing devices described herein. System 400 can be a server or any conventional personal computer, or any other processor-enabled device that is capable of wired or wireless data communication. Other computer systems and/or architectures may be also used, as will be clear to those skilled in the art.

System 400 preferably includes one or more processors, such as processor 410. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 410. Examples of processors which may be used with system 400 include, without limitation, the Pentium® processor, Core i7® processor, and Xeon® processor, all of which are available from Intel Corporation of Santa Clara, Calif.

Processor 410 is preferably connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 400 preferably includes a main memory 415 and may also include a secondary memory 420. Main memory 415 provides storage of instructions and data for programs executing on processor 410, such as one or more of the functions and/or modules discussed above. It should be understood that programs stored in the memory and executed by processor 410 may be written and/or compiled according to any suitable language, including without limitation C/C++, Java, JavaScript, Perl, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 420 may optionally include an internal memory 425 and/or a removable medium 430. Removable medium 430 is read from and/or written to in any well-known manner. Removable storage medium 430 may be, for example, a magnetic tape drive, a compact disc (CD) drive, a digital versatile disc (DVD) drive, other optical drive, a flash memory drive, etc.

Removable storage medium 430 is a non-transitory computer-readable medium having stored thereon computer-executable code (e.g., disclosed software modules) and/or data. The computer software or data stored on removable storage medium 430 is read into system 400 for execution by processor 410.

In alternative embodiments, secondary memory 420 may include other similar means for allowing computer programs or other data or instructions to be loaded into system 400. Such means may include, for example, an external storage medium 445 and a communication interface 440, which allows software and data to be transferred from external storage medium 445 to system 400. Examples of external storage medium 445 may include an external hard disk drive, an external optical drive, an external magneto-optical drive, etc. Other examples of secondary memory 420 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 400 may include a communication interface 440. Communication interface 440 allows software and data to be transferred between system 400 and external devices (e.g. printers), networks, or other information sources. For example, computer software or executable code may be transferred to system 400 from a network server via communication interface 440. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 400 with a network or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 440 are generally in the form of electrical communication signals 455. These signals 455 may be provided to communication interface 440 via a communication channel 450. In an embodiment, communication channel 450 may be a wired or wireless network, or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 415 and/or the secondary memory 420. Computer programs can also be received via communication interface 440 and stored in main memory 415 and/or secondary memory 420. Such computer programs, when executed, enable system 400 to perform the various functions of the disclosed embodiments as described elsewhere herein.

In this description, the term "computer-readable medium" is used to refer to any non-transitory computer-readable storage media used to provide computer-executable code (e.g., software and computer programs) to system 400. Examples of such media include main memory 415, secondary memory 420 (including internal memory 425, removable medium 430, and external storage medium 445), and any peripheral device communicatively coupled with communication interface 440 (including a network information server or other network device). These non-transitory computer-readable mediums are means for providing executable code, programming instructions, and software to system 400.

In an embodiment that is implemented using software, the software may be stored on a computer-readable medium and loaded into system 400 by way of removable medium 430, I/O interface 435, or communication interface 440. In such an embodiment, the software is loaded into system 400 in the form of electrical communication signals 455. The software, when executed by processor 410, preferably causes processor 410 to perform the features and functions described elsewhere herein.

In an embodiment, I/O interface 435 provides an interface between one or more components of system 400 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 400 may also include optional wireless communication components that facilitate wireless communication over a voice network and/or a data network. The wireless communication components comprise an antenna system 470, a radio system 465, and a baseband system 460. In system 400, radio frequency (RF) signals are transmitted and received over the air by antenna system 470 under the management of radio system 465.

In one embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

If the received signal contains audio information, then baseband system 460 decodes the signal and converts it to an analog signal. Then the signal is amplified and sent to a speaker. Baseband system 460 also receives analog audio signals from a microphone. These analog audio signals are converted to digital signals and encoded by baseband system 460. Baseband system 460 also codes the digital signals for transmission and generates a baseband transmit audio signal that is routed to the modulator portion of radio system 465. The modulator mixes the baseband transmit audio signal with an RF carrier signal generating an RF transmit signal that is routed to antenna system 470 and may pass through a power amplifier (not shown). The power amplifier amplifies the RF transmit signal and routes it to antenna system 470, where the signal is switched to the antenna port for transmission.

Baseband system 460 is also communicatively coupled with processor 410, which may be a central processing unit (CPU). Processor 410 has access to data storage areas 415 and 420. Processor 410 is preferably configured to execute instructions (i.e., computer programs, such as the disclosed application, or software modules) that can be stored in main memory 415 or secondary memory 420. Computer programs can also be received from baseband processor 460 and stored in main memory 410 or in secondary memory 420, or executed upon receipt. Such computer programs, when executed, enable system 400 to perform the various functions of the disclosed embodiments. For example, data storage areas 415 or 420 may include various software modules.

10. Modifications and Embodiments

The above description of the disclosed embodiments is provided to enable any person skilled in the art to make or use the inventions. Various modifications to these embodiments will be readily apparent to those skilled in the art, and the principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

What is claimed is:

1. A method comprising using at least one hardware processor of a mobile device to:
    identify at least one access point for connectivity to the mobile device;
    receive one or more credentials of a remote server;
    establish a limited connection with the identified access point via at least one radio system of the mobile device, wherein the limited connection permits communication related to authentication or authorization to utilize at least one network to which the identified at least one access point provides access;
    execute an application to
        encode a parameter into at least one of the received one or more credentials, and initiate authorization, using the one or more credentials comprising the encoded parameter, with the remote server over the at least one network via the limited connection established with the identified at least one access point, wherein the remote server is configured to decode the parameter from the one or more credentials, prior to authorization, to determine whether or not to select the at least one access point; and,
    after authorization has been completed, switch the limited connection to a non-limited connection to utilize the at least one network, to which the identified at least one access point provides access.

2. The method of claim 1, further comprising receiving a Uniform Resource Locator (URL) of the remote server in addition to the one or more credentials of the remote server.

3. The method of claim 1, further comprising using the at least one hardware processor to, when authorization has been completed, delete the one or more credentials.

4. The method of claim 1, wherein the one or more credentials comprise a username field and a password field, and wherein encoding a parameter into at least one credential comprises encoding an identifier of the identified at least one access point within one or both of the username field and the password field.

5. The method of claim 1, wherein the parameter comprises one or more performance characteristics of the identified at least one access point.

6. The method of claim 5, wherein the one or more performance characteristics, encoded in the at least one credential, comprise a quality of a signal provided by the identified at least one access point.

7. The method of claim 1, further comprising using the at least one hardware processor to, after authorization has been completed and the limited connection has been switched to the non-limited connection, move network traffic from a preexisting connection with a cellular base station to the non-limited connection.

8. The method of claim 7, further comprising using the at least one hardware processor to, after the network traffic has been moved from the preexisting connection to the non-limited connection, terminate the preexisting connection with the cellular base station.

9. The method of claim 7, wherein the at least one radio system, via which the limited connection is established, is a first radio system of the mobile device, and wherein the preexisting connection is established with the cellular base station over a second radio system of the mobile device that is different than the first radio system.

10. The method of claim 1, wherein identifying at least one access point for connectivity comprises receiving a selection of the at least one access point from a remote bandwidth exchange (BX) server.

11. The method of claim 1, wherein identifying at least one access point for connectivity comprises:
    using the at least one radio system to scan an environment to identify one or more available access points; and
    selecting the at least one access point from the one or more available access points based on one or more factors.

12. The method of claim 11, further comprising:
    for each of the one or more available access points, receiving a price to use the available access point; and
    delaying selection of the access point from the one or more available access points when a lowest one of the prices is above a predetermined threshold.

13. The method of claim 11,
    wherein the one or more available access points comprise a plurality of access points,
    wherein selecting the access point from the one or more available access points based on one or more factors comprises weighting each of the plurality of available access points based on the one or more factors, and
    wherein the selected at least one access point is the one of the plurality of available access points with a highest weighting.

14. The method of claim 1, further comprising using the at least one hardware processor to send a usage report to a remote server, wherein the usage report comprises an amount of connectivity that the identified at least one access point has provided to the mobile device.

15. The method of claim 1, further comprising using the at least one hardware processor to, prior to switching the limited connection to the non-limited connection, test a quality of the at least one network via the limited connection.

16. The method of claim 15, wherein testing the quality of the at least one network via the limited connection comprises performing a speed test over the at least one network via the limited connection.

17. A mobile device comprising:
    at least one radio system;
    a memory that stores one or more applications; and
    at least one processor that identifies at least one access point for connectivity to the mobile device, receives one or more credentials of a remote server, establishes a limited connection with the identified access point via the at least one radio system, wherein the limited connection permits communication related to authentication or authorization to utilize at least one network to which the identified at least one access point provides access, executes an application to encode a parameter into at least one of the received one or more credentials, and initiate authorization, using the one or more credentials comprising the encoded parameter, with the remote server over the at least one network via the limited connection established with the identified access point, wherein the remote server is configured to decode the parameter from the one or more credentials, prior to authorization, to determine whether or not to select the at least one access point, and, after authorization has been completed, switches the limited connection to a non-limited connection to utilize the at least one network, to which the identified at least one access point provides access.

18. A non-transitory computer-readable medium having instructions stored therein, wherein the instructions, when executed by a processor of a mobile device, cause the processor to:

identify at least one access point for connectivity to the mobile device;

receive one or more credentials of a remote server;

establish a limited connection with the identified access point via at least one radio system of the mobile device, wherein the limited connection permits communication related to authentication or authorization to utilize at least one network to which the identified at least one access point provides access;

execute an application to encode a parameter into at least one of the received one or more credentials, and initiate authorization, using the one or more credentials comprising the encoded parameter, with the remote server over the at least one network via the limited connection established with the identified access point, wherein the remote server is configured to decode the parameter from the one or more credentials, prior to authorization, to determine whether or not to select the at least one access point; and, after authorization has been completed, switch the limited connection to a non-limited connection to utilize the at least one network, to which the identified at least one access point provides access.

19. A method comprising:

using at least one hardware processor of a mobile device to identify at least one access point for connectivity to the mobile device, receive one or more credentials for a remote authentication server, encode a parameter into at least one of the received one or more credentials, and send the one or more credentials, comprising the encoded parameter, to the remote authentication server over an established temporary connection with the identified access point and, by the remote authentication server, receiving the one or more credentials from the mobile device over the established temporary connection, decoding the encoded parameter from the at least one credential, and using at least the decoded parameter to authenticate or authorize the mobile device to switch to a non-limited connectivity provided by the identified at least one access point.

20. The method of claim 19, wherein the one or more credentials comprise a username field and a password field, and wherein encoding parameter of the identified at least one access point in the credentials comprises encoding an identifier of the identified at least one access point within one or both of the username field and the password field.

21. The method of claim 19, wherein the parameter comprises one or more performance characteristics of the identified at least one access point.

22. The method of claim 21, wherein the one or more performance characteristics, encoded in the at least one credential, comprise a quality of a signal provided by the identified at least one access point.

23. The method of claim 21, wherein the parameter comprises contextual information related to one or both of the mobile device and the identified at least one access point.

24. The method of claim 19, further comprising using the at least one hardware processor to, after authorization has been completed with the remote authentication server using the one or more credentials, move network traffic of one or more applications from a preexisting connection with a cellular base station to a connection with the identified at least one access point.

25. The method of claim 1, wherein the parameter comprises an identifier of the identified at least one access point.

* * * * *